United States Patent
Kato

(10) Patent No.: US 7,193,651 B2
(45) Date of Patent: Mar. 20, 2007

(54) CAMERA SYSTEM, LENS APPARATUS AND CAMERA

(75) Inventor: Masatake Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 10/126,249

(22) Filed: Apr. 19, 2002

(65) Prior Publication Data

US 2002/0171750 A1 Nov. 21, 2002

(30) Foreign Application Priority Data

Apr. 24, 2001 (JP) ............................. 2001-126177
Mar. 29, 2002 (JP) ............................. 2002-095538

(51) Int. Cl.
- H04N 5/225 (2006.01)
- H04N 5/232 (2006.01)
- G03B 13/00 (2006.01)
- G03B 17/00 (2006.01)

(52) U.S. Cl. .................. 348/349; 348/340; 348/351; 348/360; 396/71

(58) Field of Classification Search .................. 396/71, 396/544, 529–532; 348/208.11, 346–349, 348/345, 375, 360, 361, 373–374, 335, 340
See application file for complete search history.

(56) References Cited

U.S. PATENT DOCUMENTS

| 4,792,822 | A | * | 12/1988 | Akiyama et al. | ........... 396/106 |
|---|---|---|---|---|---|
| 4,967,281 | A | * | 10/1990 | Takada | ........................ 348/361 |
| 5,146,261 | A | * | 9/1992 | Soshi | .......................... 396/93 |
| 5,371,566 | A | * | 12/1994 | Asakura | ...................... 396/71 |
| 5,434,621 | A | * | 7/1995 | Yu | .............................. 348/347 |
| 5,489,963 | A | * | 2/1996 | Imanari et al. | ............. 396/135 |
| 5,839,002 | A | * | 11/1998 | Miyake et al. | ................ 396/91 |
| 6,172,709 | B1 | * | 1/2001 | Yamano et al. | ............. 348/360 |
| 6,825,883 | B1 | * | 11/2004 | Hata | .......................... 348/345 |
| 2002/0101531 | A1 | * | 8/2002 | Kaneda | ...................... 348/347 |

* cited by examiner

Primary Examiner—Ngoc-Yen Vu
Assistant Examiner—Gregory V. Madden
(74) Attorney, Agent, or Firm—Morgan & Finnegan, LLP

(57) ABSTRACT

A camera system has a camera with a photosensitive member that records optical images; and a lens apparatus removably mounted on the camera and forming an optical image with an image taking optical system including a focus lens. Focus control of the focus lens is changed in accordance with the photosensitive member. A control circuit controls a lens driving unit and sets a driving pattern in accordance with information stored in a photosensitive member information storage circuit, and controls the lens driving unit based on focus adjustment state detected by a focus detection unit. An in-focus state can be achieved with focus accuracy suited for a photosensitive member in a combination of different cameras provided with different photosensitive members and interchangeable lenses common to these cameras.

13 Claims, 6 Drawing Sheets

CAMERA SYSTEM, LENS APPARATUS AND CAMERA

BACKGROUND OF THE INVENTION

1. Field of the Invention

The present invention relates to a camera system, and more particularly, to a camera system including a plurality of cameras using different types of photosensitive members and a lens apparatus for use in these cameras.

2. Description of the Related Art

Photosensitive members used in cameras include films and solid-state image pickup devices such as CCDs and CMOSs. Among them, in a camera (digital still camera) using a solid-state image pickup device, especially, an image pickup device is increasingly miniaturized with the advance of semiconductor technology to reach the point where a newly appearing image pickup device has a image pickup area size of 1 inch or smaller (1 inch or smaller diagonally) and several millions of pixels (megapixels). There are various types of image pickup devices of a plurality of image pickup area sizes or a plurality of pixel sizes, and an appropriate one of those image pickup devices is selected in accordance with a particular user group or applications and used in a camera.

There exists a camera system (optical apparatus) configured such that a removable interchangeable lens apparatus is mounted on such a camera for use.

In the camera system, a common interchangeable lens can be mounted on a plurality of cameras using films as photosensitive members or on a plurality of cameras provided with different image pickup devices as photosensitive members to take pictures.

Of camera systems (camera systems) as described above, for example in a digital camera system, an image pickup device does not particularly require a reference or standardized image pickup area size, so that the image pickup area size of the image pickup device can be arbitrarily set in accordance with applications, and the pixel size of the image pickup device can also be arbitrarily set in accordance with the grade, price, and applications of the camera.

For cameras using image pickup devices with different image pickup area sizes, however, different levels of focus accuracy (in-focus accuracy) are required due to a difference in enlarging factors. Even when image pickup devices have the same image pickup area sizes, resolutions are different if they have different pixel sizes. Thus, the diameter of a permissible circle of confusion varies in focusing.

Therefore, in the aforementioned digital camera system, an image pickup device is selected for use in the camera in accordance with focus accuracy in the interchangeable lens apparatus or the diameter of a permissible circle of confusion on the image pickup surface of the image pickup device serving as a photosensitive member.

When attempts are made to increase the size or resolution of a taken image, a possible camera system (optical apparatus) is configured to use, instead of a camera provided with an image pickup device (herein referred to as "a first image pickup device"), a camera provided with an image pickup device (herein referred to as "a second image pickup device") with different specifications from the first image pickup device, that is, a larger image pickup area size or a smaller pixel size. Similarly, for a camera using a film as a photosensitive member, a possible camera system (optical apparatus) uses a film having a higher resolution than a resolution of another film to achieve a higher resolution of a taken image.

In this case, however, the aforementioned interchangeable lens apparatus cannot be used in common to the camera using the first image pickup device, the camera using the second image pickup device, and the camera using the film as a photosensitive member.

SUMMARY OF THE INVENTION

It is an object of the present invention to provide a camera system including a plurality of types of cameras provided with different photosensitive members and an interchangeable lens apparatus which can be used in common to these cameras, the camera system being capable of achieving focus accuracy suitable for the photosensitive members.

To achieve the aforementioned object, the present invention provides a camera system comprising:

a camera using a photosensitive member to record an optical image; and a lens apparatus removably mounted on the camera and forming an optical image with an image taking optical system including a focus lens, wherein a driving pattern of the focus lens for achieving an in-focus state in the lens apparatus is changed in accordance with information about the photosensitive member.

To achieve the aforementioned object, the present invention provides a camera system having a camera using a photosensitive member to record an optical image, and a lens apparatus removably mounted on the camera and forming an optical image with an image taking optical system including a focus lens, the camera system comprising:

a focus detection unit provided for the camera and detecting a focus adjustment state of the image taking optical system;

a photosensitive member information storage circuit provided for the camera and storing information about the photosensitive member;

a lens driving unit provided for the lens apparatus and driving the focus lens for achieving an in-focus state; and a control circuit for controlling the lens driving unit, wherein the control circuit is provided for the lens apparatus or the camera, and the control circuit sets a driving pattern of the focus lens in accordance with the information about the photosensitive member stored in the photosensitive member information storage circuit, and uses the information about the set driving pattern to control the lens driving unit based on information detected by the focus detection unit.

In addition, to achieve the aforementioned object, the present invention provides a lens apparatus for forming an optical image with an image taking optical system including a focus lens, the lens apparatus being removably mounted on a camera using a photosensitive member to record an optical image, the camera comprising a focus detection unit for detecting a focus adjustment state of the image taking optical system and a photosensitive member information storage circuit for storing information about the photosensitive member, the lens apparatus comprising:

a lens driving unit for driving the focus lens;

a communication circuit for performing information communication between the lens apparatus and the camera; and a control circuit for controlling the lens driving unit, wherein the control circuit acquires the information about the photosensitive member stored in the photosensitive member information storage circuit and the information detected by the focus detection unit through the communication circuit, sets a driving pattern of the focus lens in accordance with the information about the photosensitive member, and uses the information about the set driving pattern to control the lens driving unit based on the information detected by the focus detection unit.

Furthermore, to achieve the aforementioned object, the present invention provides a camera using a photosensitive member to record an optical image on which a lens apparatus for forming an optical image with an image taking optical system including a focus lens is removably mounted, the camera comprising:

a focus detection unit for detecting a focus adjustment state of the image taking optical system;

a photosensitive member information storage circuit for storing information about the photosensitive member; and a communication circuit for performing information communication between the camera and the lens apparatus, wherein information detected by the focus detection unit and the information about the photosensitive member stored in the photosensitive member information storage circuit are transmitted to the lens apparatus through the communication circuit.

In the aforementioned respective aspects of the present invention, as the photosensitive member, an image pickup device such as a CCD and CMOS which records optical images is converted into electrical signal or a film (silver film) may be used.

When such an image pickup device is used as the photosensitive member, the information about the photosensitive member includes an image pickup area size (dimensions of the width, length and diagonal of the image pickup area), the number of pixels, a pixel size and the diameter of a permissible circle of confusion on the image pickup surface of the image pickup device. When a film is used as the photosensitive member, the information about the photosensitive member includes information on the diameter of a permissible circle of confusion of the film.

As the lens driving unit, a stepping motor or a DC motor may be used. The driving pattern when the stepping motor is used includes a driving voltage waveform (sine wave and rectangular wave), while the driving pattern when the DC motor is used includes a driving pitch of a focus lens (for example, a pitch for pulse detection by an encoder).

The focus detection unit includes one in a contrast scheme (TV-AF scheme) for detecting an in-focus state by evaluating the sharpness of the contrast in an image signal from the image pickup device on a time series basis while the focus lens is slightly vibrated (wobbled) in accordance with various status (of the zoom position, subject distance, F number) of the image taking optical system, and one in a phase difference scheme for detecting a defocus amount from the correlation between two images obtained from luminous fluxes divided at the position of the pupil of the image taking optical system. The wobbling amount of the focus lens may be changed in accordance with a selected driving pattern, or a condition for determining an in-focus state of the image taking optical system may be changed in accordance with a selected driving pattern. The information on the wobbling amount used in the contrast scheme may be previously stored on the memory in the lens apparatus.

DESCRIPTION OF THE PREFERRED EMBODIMENTS

Figure 1:
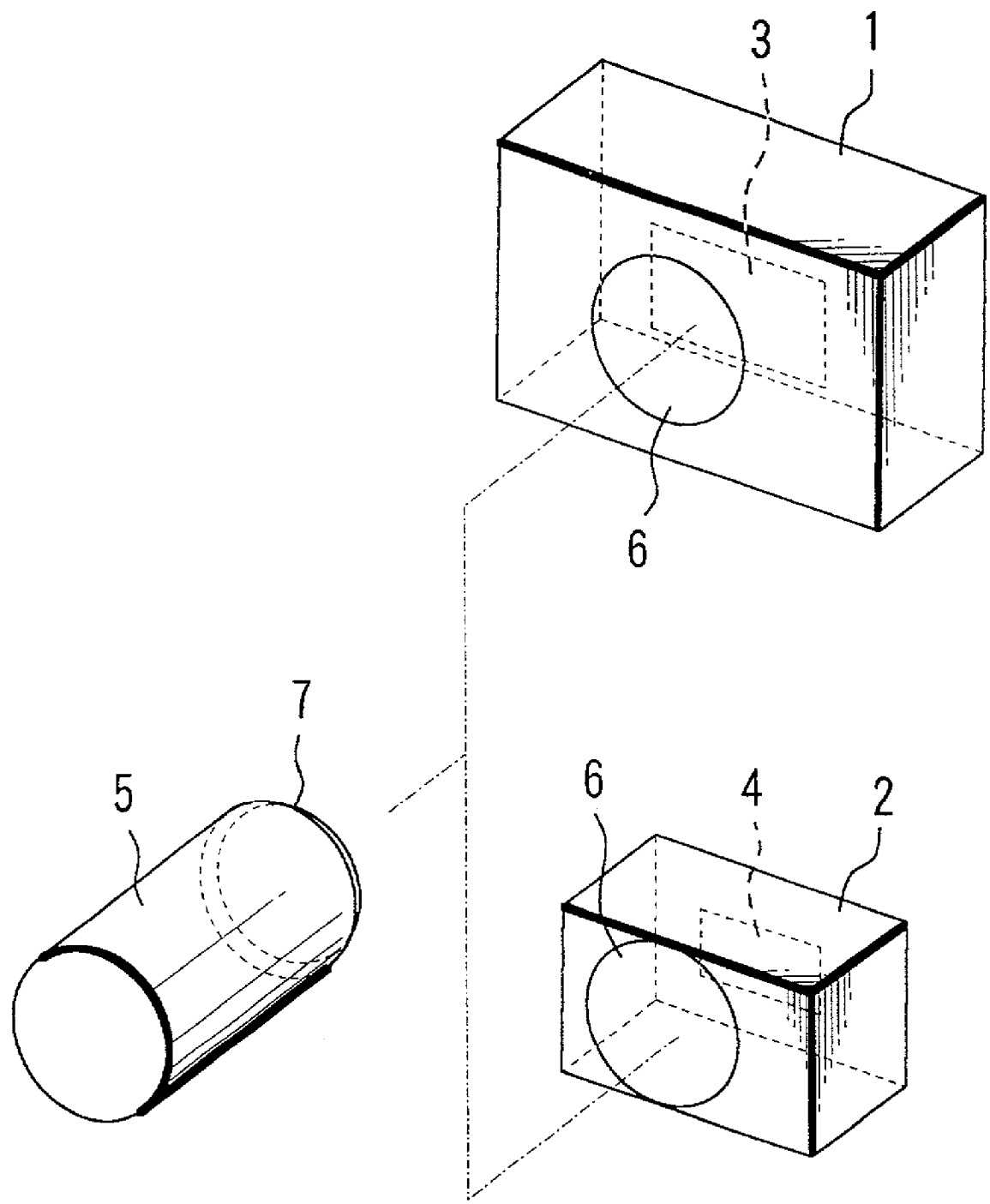
FIG. 1 is a conceptual diagram for explaining the concepts of a camera system of the present invention.

FIG. 1 conceptually shows a camera system (optical apparatus) including cameras and an interchangeable lens mounted removably on the cameras through attachment/detachment mounts, as an exemplary camera system to which the present invention is applied. While the cameras in the present invention take images (record optical images is converted into electrical signal) using image pickup devices such as CCDs and CMOSs as photosensitive members, the present invention is applicable to a camera which takes images (records optical images) using a films (silver film) instead of the image pickup devices.

In FIG. 1, reference number 1 shows a first camera provided with a first image pickup device 3 having a relatively large image pickup area size. Reference number 2 shows a second camera provided with a second image pickup device 4 having an image pickup area size smaller than that of the first image pickup device 3.

The first image pickup device 3 has the image pickup area size of 28×18.7 mm (width×length), a diagonal length of approximately 33.6 mm, six millions of pixels, and a pixel size (pixel pitch) of approximately 9.3 microns.

The second image pickup device 4 has the image pickup area size of 15×10 mm (width×length), a diagonal length of 18 mm, six millions of pixels, and a pixel size (pixel pitch) of approximately 5 microns.

The first image pickup device 3 and the second image pickup device 4 have substantially the same aspect ratios of the image pickup areas. It should be noted that the aforementioned image pickup devices are illustrative, and an image pickup device having an image pickup area size and the number of pixels other than those mentioned above may be used (for example, an image pickup device having a pixel size of 2 micron).

Reference number 5 shows an interchangeable lens (lens apparatus). The interchangeable lens 5 has a zooming optical system including a variable power lens (zoom lens) and a focus lens. Reference number 6 shows a camera side mount member common to the first camera 1 and the second camera 2. Reference number 7 shows a lens side mount member corresponding to the camera side mount member 6 and provided for the interchangeable lens 5. By attaching the lens side mount member 7 to the camera side mount member 6, the interchangeable lens 5 can be mounted on both of the first camera 1 and the second camera 2, and further, on a camera, using a film as a photosensitive member, although not shown.

In an embodiment in FIG. 1, the focus lens of the interchangeable lens 5 is driven with different driving patterns, that is, with different levels of accuracy when the interchangeable lens 5 is mounted on the first camera 1, when it is mounted on the second camera 2, and when it is mounted on a camera using a film as a photosensitive member. Thus, focus accuracy resulting from the driving of the focus lens can be provided suitably for each of the photosensitive members used in the respective cameras.

Specifically, in the embodiment, since the second image pickup device 4 has the smaller image pickup area size and the smaller pixel size than the image pickup area size and the pixel size of the first image pickup device 3, the driving pattern of the focus lens is changed in the interchangeable lens 5 such that the focus accuracy is enhanced when the second image pickup device 4 is used, and when the first image pickup device 3 is used, the focus accuracy is lower than that when the second image pickup device 4 is used but an in-focus state can be attained faster.

The interchangeable lens mountable on a plurality of cameras having image pickup area sizes or pixel sizes different from one another such as a camera using a film as a photosensitive member and a camera using an image pickup device as a photosensitive member needs to be configured on the assumption that it is mounted on the camera which requires the most exacting focus accuracy.

The high accuracy driving and the fast-response driving in the focusing drive are typically contradictory to each other. Thus, when the interchangeable lens is mounted on a camera which does not require high accuracy of focusing drive, priority may be given to fast responsibility in the focusing drive in the interchangeable lens.

Next, embodiments of the camera system of the present invention will be described more specifically.

Figure 2:
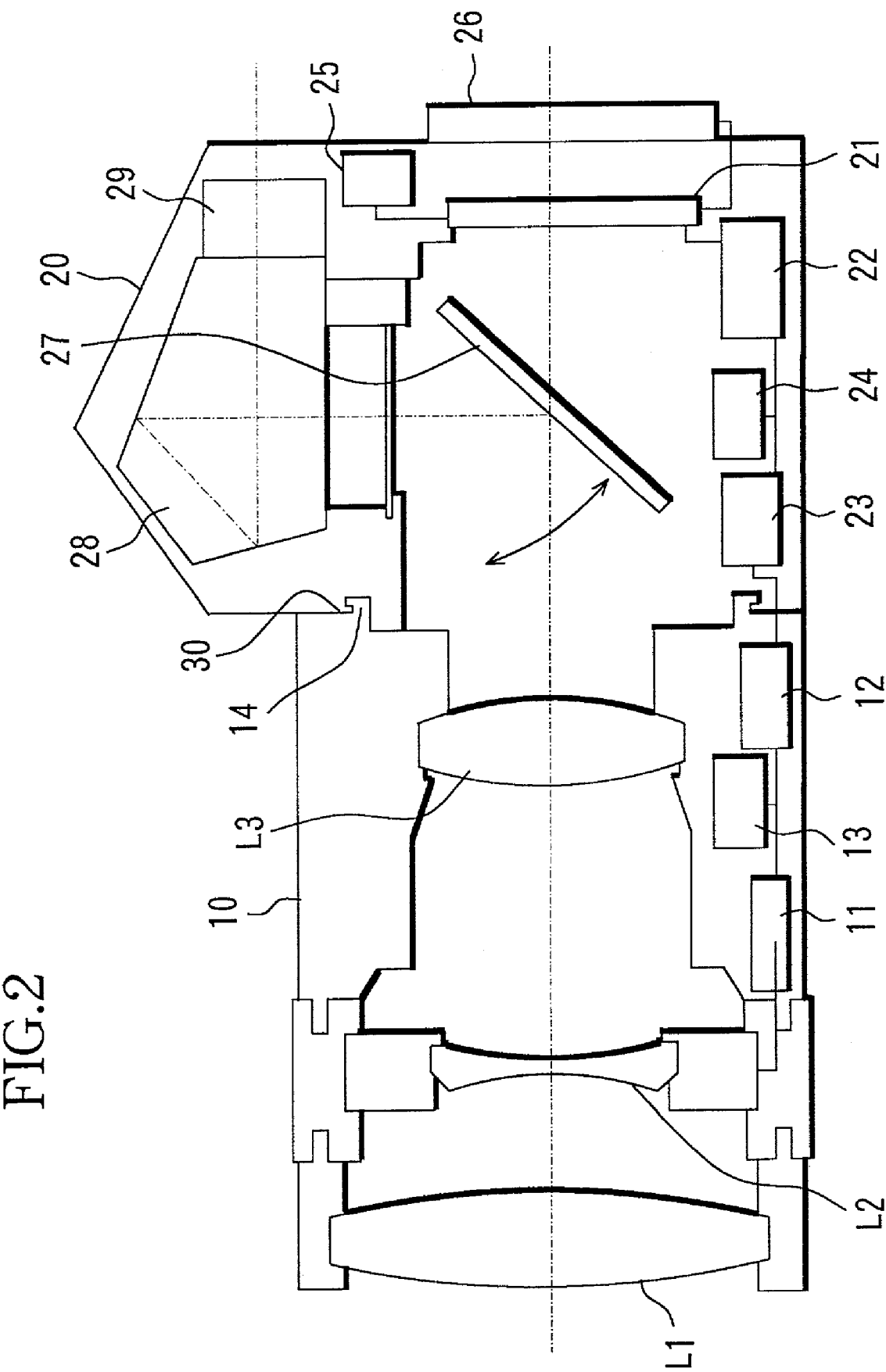
FIG. 2 is a block diagram showing a first embodiment of the camera system of the present invention.

FIG. 2 shows the configuration of a camera system (digital camera system) which is an embodiment of the present invention. The camera system includes a camera (digital still camera) having an image pickup device serving as a photosensitive member and an interchangeable lens mounted removably on the camera through mount members.

In FIG. 2, reference number 10 shows the interchangeable lens as a lens apparatus, and reference number 20 shows the camera (digital still camera). The interchangeable lens 10 is a zooming optical system having a first lens L1, a focus lens L2, and a second lens L3, in which the lenses L1 to L3 are moved in an optical axis direction to provide variable powers and the focus lens L2 is moved in the optical axis direction to perform focus adjustment.

Reference number 11 shows a focus motor serving as a lens driving unit for driving the focus lens L2 to be moved in the optical axis direction. In the embodiment, the focus motor 11 is implemented by a stepping motor.

Reference number 12 shows a lens side CPU for performing communication of various information between itself and a camera side CPU in the camera 20, later described, and for governing driving of the focus motor 11 in the interchangeable lens 10 and control of respective portions such as a light amount adjuster (stop) which is omitted in FIG. 2.

Reference number 13 shows a memory. As the memory 13, various memories are used such as a ROM, a RAM, or an EEPROM which is a nonvolatile memory allowing rewrite of information. The memory 13 may be contained in the CPU 12.

Reference number 14 shows a lens side mount member which is removably coupled to a mount member of the camera 20, later described. The stepping motor implementing the aforementioned focus motor is a kind of pulse motor, and after the initial position of the focus lens L2 is determined, stepping pulses are incremented or decremented and the number of the pulses is counted to enable accurate detection of the position of the lens.

Therefore, the position of the focus lens L2 is detected without requiring an encoder and the focus lens L2 is readily controlled. The driving of the stepping motor is controlled by applying a voltage (or a current) to the motor. For high accuracy driving in which the driving of the stepping motor is controlled with a higher precision, the motor is driven by applying a sine wave voltage (a voltage in a sine wave driving pattern). Alternatively, when high speed driving is performed, the motor is driven by applying a rectangular wave voltage (a voltage in a rectangular wave driving pattern).

Reference number 21 shows an image pickup device such as a CCD provided in the camera 20. While the CCD is herein shown as the image pickup device, another image pickup device such as a CMOS may be used. Reference number 22 shows a focus detection circuit for detecting a focus adjustment state based on an image signal output from the image pickup device 21, and reference number 23 shows the camera side CPU for governing control of respective sections in the camera 20.

Reference number 24 shows a memory. As the memory 24, various memories are used such as a ROM, a RAM, or an EEPROM which is a nonvolatile memory allowing rewrite of information. The memory 24 may be contained in the camera side CPU 23.

Reference number 25 shows a memory for saving images which is a recording medium contained in the camera 20 or removably loaded into the camera 20 and electrically connected thereto. The memory 25 saves (stores) image signals output from the image pickup device 21.

Reference number 26 shows a display for displaying image signals output from the image pickup device 21 as images. The display 26 is implemented by a display device such as a liquid crystal panel display. Reference number 27 shows a quick return mirror, 28 a prism, and 29 an eyepiece optical system. The quick return mirror 27 is formed of a half mirror in its area corresponding to some or all of the center of the optical axis of the image taking optical path in the camera 20.

The quick return mirror 27 is positioned in the image taking optical path (as shown in FIG. 2) to guide light from the zooming optical system to the image pickup device 21 and to the prism 28 in an image taking ready state in which an image taking switch (two-stage switch) provided for the camera 20, omitted in FIG. 2, is half pressed. In this state, an user of the camera 20 can observe a subject through the optical viewfinder (the prism 28 and the eyepiece optical system 29). The quick return mirror 27 is configured to retract from the image taking optical path in an image taking state in which the image taking switch is fully pressed after the half press.

Reference number 30 shows the camera side mount member which is removably coupled to the lens side mount member 14 of the interchangeable lens 10. The lens side mount member 14 and the camera side mount member 30 have electrical contacts, omitted in FIG. 2, through which electrical power is supplied from the camera 20 to the lens 10 and the camera side CPU 23 can communicate with the lens side CPU 12 while the interchangeable lens 10 is mounted on the camera body 20 through the mount members 14, 30.

The aforementioned memory 24 in the camera 20 has information about the image pickup device 21 as a photosensitive member previously stored therein, that is, information on the image pickup area size and information on the pixel size of the image pickup device 21. In addition to the information on the image pickup area size and the information of the pixel size of the image pickup device, information about the image pickup device 21 may include information on the number of pixels and information on the diameter of a permissible circle of confusion on the image pickup surface of the image pickup device, and such information may be previously stored in the memory 24.

The camera side CPU 23 is configured such that it acquires the information in the memory 24 and transmits the acquired information to the lens side CPU 12 through the aforementioned electrical contacts.

The memory 13 in the interchangeable lens 10 has, previously stored therein, information on a plurality of driving patterns for driving the focus motor 11, information on an amount of wobbling in a focusing operation in contrast scheme (TV-AF scheme) autofocus, later described, and information on arithmetic expressions for determining a factor of proportionality for changing the information on the wobbling amount.

The information on the plurality of driving patterns include sine wave driving pattern information for driving the focus motor 11 with high accuracy and rectangular wave driving pattern information for driving the focus motor 11 at high speed. Each driving pattern information may include a plurality of pieces. The information on the wobbling amount includes information on a plurality of wobbling amounts in accordance with variable statuses of the zooming optical system such as the statuses of the zoom position, the subject distance, and the aperture value (the state of the stop).

The information on the operational expressions for determining a factor of proportionality C is represented by:

$$C = Y/34 \times Z/9 \quad (1)$$

where Y represents the diagonal size of the image pickup area of the image pickup device, and Z represents the pixel size of the image pickup device.

Next, description will be made for a focusing mechanism in the aforementioned contrast (TV-AF) scheme. In the embodiment, light from the interchangeable lens 10 is imaged on the image pickup device 21 and photoelectrically converted by the image pickup device 21 to produce an image signal which is then output to the focus detection circuit 22.

The focus detection circuit 22 outputs the value of high frequency components (value of focus voltage) from the image signal as an AF evaluation value signal to the camera side CPU 23. The camera side CPU 23 compares on a time series basis respective AF evaluation value signals obtained while the focus lens L2 is moved forward and backward on the optical axis, and determines that in-focus state is achieved when the AF evaluation value is at the maximum. Thus, the focus lens L2 of the interchangeable lens 20 is driven by the focus motor 11 such that it is slightly moved forward and backward on the optical axis in a focus adjustment operation.

Such an operation of moving the focus lens forward and backward slightly on the optical axis is referred to as a wobbling operation. As an amount of wobbling in the wobbling operation, the information on the plurality of wobbling amounts is prepared in accordance with variable statuses of the zooming optical system such as the statuses of the zoom position, the subject distance and the stop, and the value of the optimal wobbling amount for each state is used to perform the wobbling operation of the focus lens L2.

Specifically, since the wobbling amount (a difference in in-focus range) varies due to depth of field, the wobbling operation (operation for defocusing) of the focus lens L2 needs to be performed a larger amount at the wide end than at the tele end of the zoom position, at the far end than at the near end of the subject distance, and in a smaller aperture than in an open state of the stop. The wobbling operation allows determination of a direction of focusing on the image pickup surface of a direction of the image pickup device.

Figure 3:
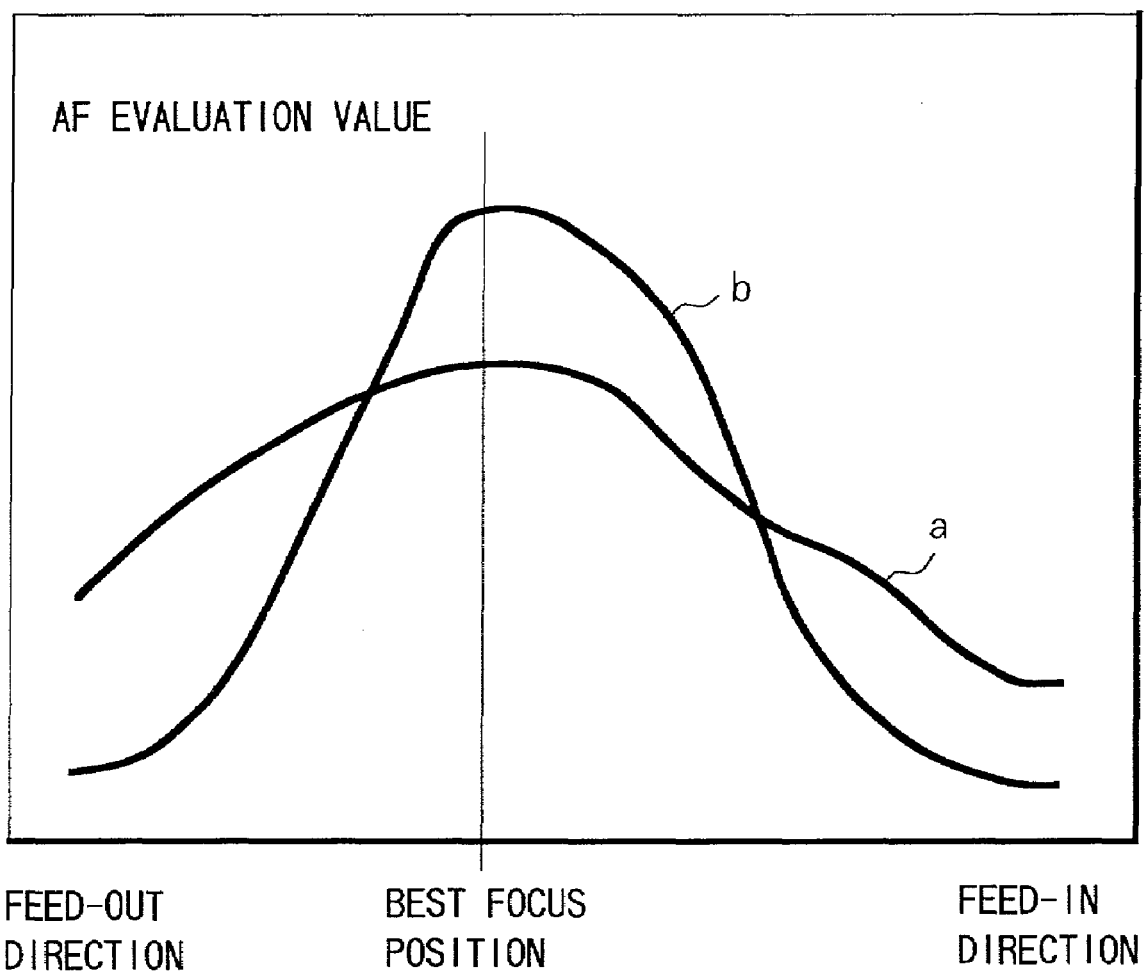
FIG. 3 is a graph for explaining AF evaluation values in a contrast scheme in which an image pickup device in FIG. 2 is used.

FIG. 3 shows the AF evaluation values in the aforementioned contrast (TV-AF) scheme. In FIG. 3, the horizontal axis represents the position of the focus lens on the optical axis, while the vertical axis represents the AF evaluation value (values of focus voltage). In FIG. 3, 0 point indicates the sharpest focusing state (in-focus state) at which the AF evaluation value is at the maximum.

A curve a in FIG. 3 represents the interchangeable lens 10 in the wide range, while a curve b represents the interchangeable lens 10 in the tele range. It can be seen from the graph that the focus lens has a higher focus sensitivity in the tele range.

Thus, the wobbling amount of the focus lens L2 is smaller in the tele range, while the wobbling amount is larger in the wide range than the wobbling amount in the tele range. The driving of the focus lens L2 is controlled with these wobbling amounts.

Next, a focusing operation performed by the camera side CPU 23 and the lens side CPU 12 in the embodiment will be described with reference to a flow chart in FIG. 4.

First, the interchangeable lens 10 is mounted on the camera 20 by coupling the mount member 14 of the interchangeable lens 10 to the mount member 30 of the camera 20. In this manner, the interchangeable lens 10 is connected to the camera 20 such that electrical power is supplied from the camera 20 to the interchangeable lens 10 and they communicate with each other through the electrical contacts of the mount members 14, 30.

The camera side CPU 23 reads from the memory 24 the information about the image pickup device 21, that is, the aforementioned information on the image pickup area size (diagonal length Y) of the image pickup device 21 and the information on the pixel size (Z) and transmits the information about the image pickup device 21 to the lens side CPU 12 (step 401).

Next, the lens side CPU 12 determines whether the information on the pixel side Z indicates a size smaller than 7 μm (step 402). When it is determined at step 402 that the information on the pixel size Z indicates a size smaller than 7 μm, the CPU 12 then determines whether the information on the diagonal length Y of the image pickup area size of the image pickup device 21 indicates a size smaller than 20 mm (step 403).

When it is determined at step 403 that the information on the diagonal length Y indicates a size smaller than 20 mm, the lens side CPU 12 selects a high accuracy mode in which a higher priority is given to focus accuracy, and the CPU 12 selects the sine wave driving pattern information (sine wave driving pattern signal) for driving the focus motor 11 in the high accuracy mode from the memory 13 in the interchangeable lens 10 and calculates the factor of proportionality C for calculating an amount of wobbling in the high accuracy mode from the aforementioned conditional expression (1) (step 404).

Then, the CPU 12 reads from the memory 13 information on an amount of wobbling (information on an amount of wobbling in a normal mode: hereinafter referred to as "a normal amount") associated with the status of the current zoom position of the interchangeable lens 10, the status of the subject distance, and the F number. The CPU 12 multiplies the information on the wobbling amount by the factor of proportionality C calculated at step 404 to calculate an amount of wobbling (which is smaller than the aforementioned normal amount) in the high accuracy mode (step 405).

The CPU 12 adds the signal indicating the wobbling amount calculated at step 405 to the aforementioned sine wave driving pattern signal selected at step 404 to obtain a focusing drive signal in the high accuracy mode. The focus motor 11 is driven with the focusing drive signal to move the focus lens L2 (move the focus lens L2 with a wobbling operation) (step 406).

Next, the camera side CPU 23 determines through the focus detection circuit 22 whether or not an in-focus state is achieved (step 407). The in-focus state refers to the sharpest focusing state in which the aforementioned AF evaluation value is at the maximum.

On the other hand, when it is determined at step 402 described above that the information on the pixel size Z indicates a size equal to or larger than 7 μm, the lens side CPU 12 determines whether the information on the diagonal length Y of the image pickup area size of the image pickup device 21 indicates a size smaller than 20 mm (step 408).

Next, when it is determined at step 408 that the information on the diagonal length Y indicates a size smaller than 20 mm, the CPU 12 selects an intermediate accuracy mode and selects from the memory 13 in the interchangeable lens 10 the sine wave driving pattern information (sine wave driving pattern signal) for driving the focus motor 11 in the intermediate accuracy mode. In addition, the CPU 12 calculates the factor of proportionality C for calculating an amount of wobbling in the intermediate accuracy mode from the aforementioned conditional expression (1) (step 409).

When it is determined at step 403 described above that the information on the diagonal length Y indicates a size equal to or larger than 20 mm, the lens side CPU 12 also selects the intermediate accuracy mode and performs the operation at step 409.

The CPU 12 reads from the memory 13 the information on the wobbling amount (normal amount) associated with the status of the current zoom position of the interchangeable lens 10, the status of the subject distance, and the F number. The CPU 12 multiplies the information on the wobbling amount by the factor of proportionality C calculated at step 409 to calculate an amount of wobbling in the intermediate accuracy mode (which is an amount of wobbling smaller than the normal amount and larger than the amount of wobbling in the high accuracy mode) (step 405).

The CPU 12 adds the signal indicating the wobbling amount calculated at step 405 to the sine wave driving pattern signal in the intermediate accuracy mode selected at step 409 described above to obtain a focusing drive signal in the intermediate accuracy mode. The focus motor 11 is driven with the focusing drive signal to move the focus lens L2 (move the focus lens L2 with a wobbling operation) (step 406). Next, the camera side CPU 23 determines through the focus detection circuit 22 whether or not an in-focus state is achieved (step 407).

In addition, when it is determined at step 408 described above that the information on the diagonal length Y indicates a size equal to or larger than 20 mm, the lens side CPU 12 selects a high speed mode, and selects the rectangular wave driving pattern information (rectangular wave driving pattern signal) for driving the focus motor 11 in the high speed mode from the memory 13 in the interchangeable lens 10. Since the normal amount is used as it is as an amount of wobbling in the high speed mode, 1 is set as the factor of proportionality C (C=1) (step 410).

The CPU 12 reads from the memory 13 the information on the wobbling amount (normal amount) associated with the status of the current zoom position of the interchangeable lens 10, the status of the subject distance, and the F number, and multiplies the information on the wobbling amount by the factor of proportionality C equal to 1 at step 410 to calculate an amount of wobbling in the high speed mode (step 405).

The CPU 12 adds the signal indicating the wobbling amount calculated at step 405 to the rectangular wave driving pattern signal in the high speed mode selected at step 410 described above to obtain a focusing drive signal in the high speed mode. The focus motor 11 is driven with the focusing drive signal to move the focus lens L2 (move the focus lens L2 with a wobbling operation) (step 406). Next, the camera side CPU 23 determines through the focus detection circuit 22 whether or not an in-focus state is achieved (step 407).

When it is determined at step 407 that the in-focus state is achieved, a predetermined image taking operation is performed in response to full press on the picture taking switch by an operator (step 411). In the image taking operation of the camera using the image pickup device, the image pickup device photoelectrically converts an optical image into an image signal which is then processed by an image processing circuit omitted in FIG. 2, saved (stored) in the memory 25 for saving images, and displayed on the display 26.

Figure 4:
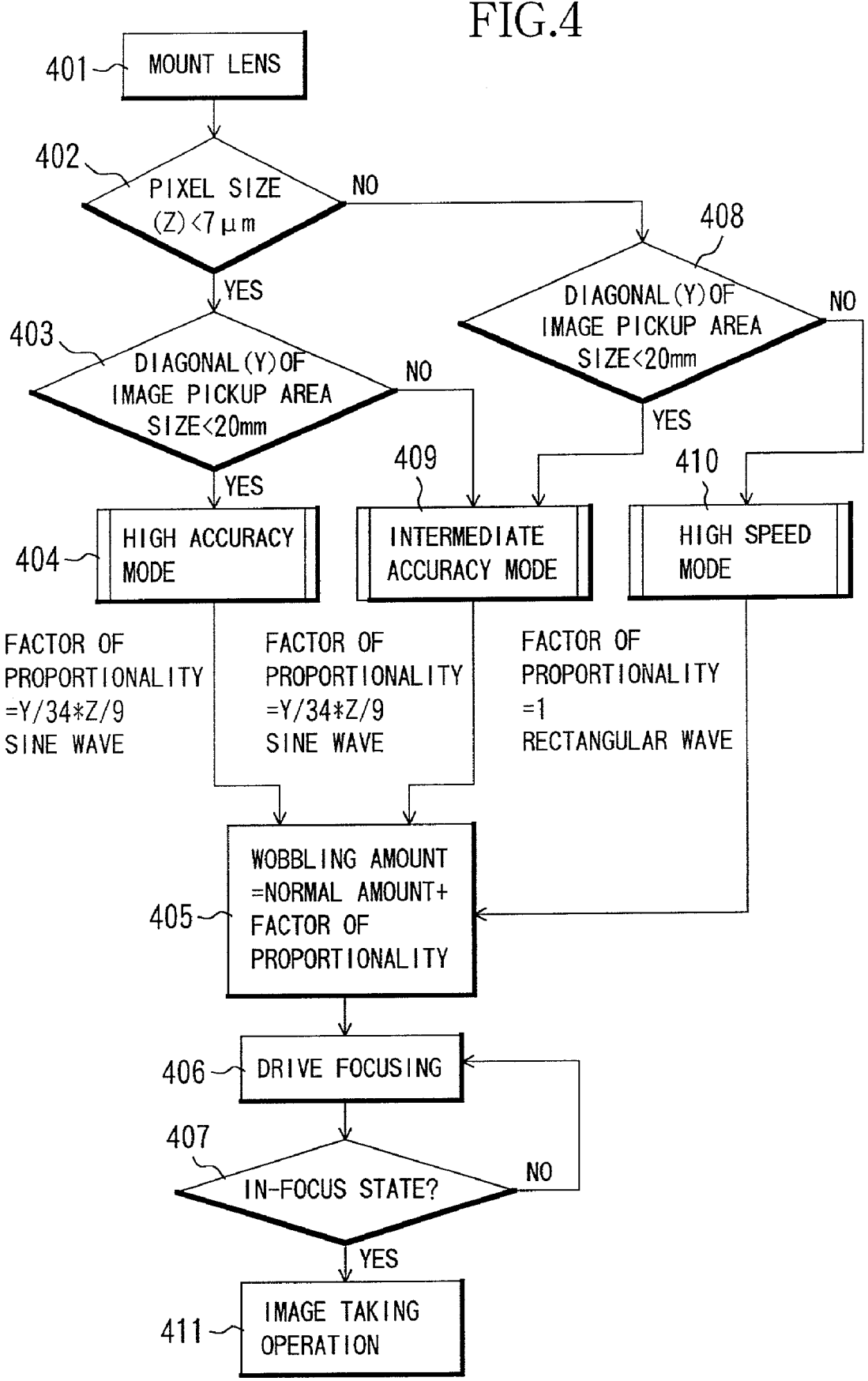
FIG. 4 is a flow chart for explaining a focusing operation in the camera system in FIG. 2.

In the aforementioned description of the flow chart in FIG. 4, each of the operation of acquiring the information about the image pickup device and the operation of calculating the factor of proportionality needs to be performed only once when the interchangeable lens 10 is mounted on the camera 20. The acquired information on the image pickup device 21 and the calculated factor of proportionality may be stored in the memory 13 in the lens such that the stored factor of proportionality is used to perform the aforementioned operation at step 405.

As described above, in the embodiment, an appropriate driving pattern of the focus motor for driving the focus lens L2 of the interchangeable lens 10 is selected from the plurality of driving patterns in accordance with the information about the image pickup device 21 in the camera 20 on which the interchangeable lens 10 is mounted, and the factor of proportionality for determining the wobbling amount used in the wobbling operation is calculated to change the wobbling amount, thereby performing a focusing operation best suited to the image pickup device 21. It is thus possible to achieve an in-focus state with focus accuracy appropriate for the image pickup device 21. Therefore, a single interchangeable lens 10 can be used in common to a plurality of types of cameras such as a camera using a film and cameras using different image pickup devices.

The embodiment has been described for the lens side CPU 12 selecting the information indicating the high accuracy mode, the intermediate accuracy mode, or the high speed mode based on the information about the image pickup device transmitted from the camera and calculating the information on the factors of proportionality in these modes. Instead, the camera side CPU 23 may select the information indicating the high accuracy mode, the intermediate mode, or the high speed mode based on the information about the image pickup device, calculate the information on the factors of proportionality in these modes, and transmit the information to the lens side CPU 12 to perform the operations from step 405 in FIG. 4 onward.

In this case, the information indicating the high accuracy mode, the intermediate accuracy mode, or the high speed mode may be stored in the memory 24 in the camera. The information on the factor of proportionality in each mode may also be selected from the memory 24 in the camera.

Such a configuration and operations can advantageously provide quick processing in the lens side CPU 12 to achieve fast operations and processing as a camera system (optical apparatus).

Figure 5:
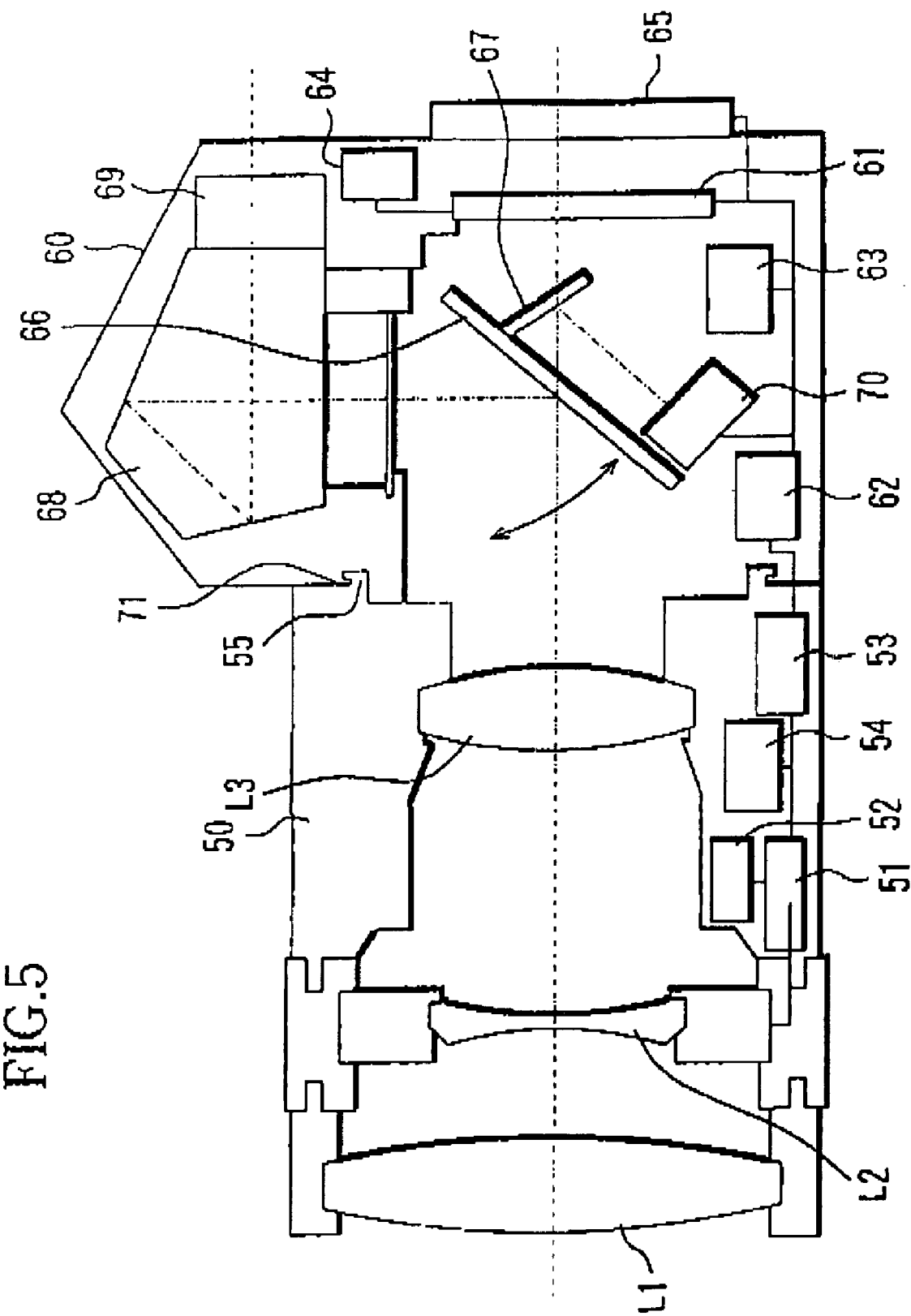
FIG. 5 is a block diagram showing a second embodiment of the camera system of the present invention.

FIG. 5 shows the configuration of a camera system (optical apparatus) which is another embodiment of the present invention. The camera system includes a camera using an image pickup device or a silver film serving as a photosensitive member and an interchangeable lens removably mounted on the camera through mount members.

In FIG. 5, reference number 50 shows the interchangeable lens, and reference number 60 shows the camera (a digital still camera or a camera using a film).

The interchangeable lens 50 is a zooming optical system having a first lens L1, a focus lens L2 and a second lens L3, in which these lenses L1 to L3 are moved in an optical axis direction to provide variable powers and the focus lens L2 is moved in the optical axis direction to provide focus adjustment.

Reference number 51 shows a focus motor serving as a lens driving unit for driving the focus lens L2 to be moved in the optical axis direction. The focus motor 51 is implemented by a DC motor. Reference number 52 shows an encoder which is formed of a pulse plate rotated in response to the driving of the focus motor 51 and a photointerrupter. The encoder 52 is configured such that the pulse plate has a plurality of slits formed therein with a predetermined pitch and the photointerrupter detects the slits of the rotated pulse plate to output pulses. The pulses output from the encoder 52 are counted to allow detection of the amount of driving (the amount of rotating) of the focus motor 51 and thus the amount of movement of the focus lens L2 driven by the focus motor 51.

Reference number 53 shows a lens side CPU for performing communication of various information between itself and a camera side CPU in the camera 60, later described, and for governing driving of the focus motor 51 in the interchangeable lens 50 and control of respective sections such as a light amount adjuster (stop) omitted in FIG. 5.

Reference number 54 shows a memory. As the memory 54, various memories are used such as a ROM, a RAM, or an EEPROM which is a nonvolatile memory allowing rewrite of information. The memory 54 may be contained in the lens side CPU 53.

Reference number 55 shows a lens side mount member which is removably coupled to a mount member of the camera 60, later described. The DC motor implementing the aforementioned focus motor 51 is driven by applying a voltage thereto. The number of revolutions of the DC motor can be changed by changing the value of the applied voltage or by controlling the frequency of the applied voltage to change the duty ratio of the applied voltage.

The aforementioned driving amount (rotating amount) of the DC motor and the moving amount of the focus lens L2 can be detected by counting the pulses output from the encoder 52. In the embodiment, the pitch (minimum resolution pitch) of the slits formed in the pulse plate is set corresponding to the driving pitch (high accuracy driving pitch) of the focus lens for the photosensitive member with the smallest diameter of a permissible circle of confusion on the photosensitive surface (film surface or image pickup surface) of photosensitive members (films or image pickup devices) being used, so that it is possible to detect the driving pitch (high accuracy driving pitch) of the focus lens L2 for the photosensitive member (film or image pickup device) with the smallest diameter of a permissible circle of confusion on the photosensitive surface.

Reference number 61 shows an image pickup device serving as a photosensitive member such as a CCD provided in the camera 60. While the CCD is shown as the image pickup device, another image pickup device such as a CMOS may be used.

Reference number 62 shows the camera side CPU for governing control of respective sections in the camera 60. Reference number 63 shows a memory. As the memory 63, various memories are used such as a ROM, a RAM, or an EEPROM which is a nonvolatile memory allowing rewrite of information. The memory 63 may be contained in the camera side CPU 62.

Reference number 64 shows a memory for saving images which is a recording medium contained in the camera 60 or removably loaded into the camera 60 and electrically connected thereto. The memory 64 saves (stores) image signals output from the image pickup device 61.

Reference number 65 shows a display for displaying image signals output from the image pickup device 61 as images. The display 65 is implemented by a display device such as a liquid crystal panel display.

Reference number 66 shows a quick return mirror, 67 a submirror, 68 a prism, 69 an eyepiece optical system, and 70 an AF sensor having a pair of line sensors. The quick return mirror 66 is formed of a half mirror in its area corresponding to some of the center of the optical axis of the image taking optical path in the camera 60 such that luminous fluxes transmitted through the half mirror area are reflected by the submirror 67 and guided to the AF sensor 70.

The quick return mirror 66 is positioned in the image taking optical path (as shown in FIG. 5) in an image taking ready state in which a image taking switch (two-stage switch) of the camera 60, omitted in FIG. 5, is half pressed, and two luminous fluxes divided at the position of the pupil in the zooming optical system are transmitted through the half mirror area, reflected by the submirror 67, and guided to the AF sensor 70. The quick return mirror 66 also reflects light from the zooming optical system of the interchangeable lens 50 and guides the reflected light toward the prism 68. In this state, an user of the camera 60 can observe a subject through the optical viewfinder (the prism 68 and the eyepiece optical system 69).

In addition, the quick return mirror 66 is configured to retract together with the submirror 67 from the image taking optical path in an image taking state in which the image taking switch is fully pressed after the half press.

For a camera using a film, the aforementioned memory 64 for saving images and the display 65 may be omitted. Alternatively, an optical image may be formed by another image pickup device (not shown) from the light guided toward the prism 68 by the quick return mirror 66 to display the resulting image signal on the display 65.

The aforementioned AF sensor 70 constitutes an AF detection system in a TTL phase difference detection scheme which forms an image a and an image b on the pair of line sensors constituting the AF sensor 70 from the two luminous fluxes divided at the position of the pupil in the zooming optical system of the interchangeable lens 50 to detect the focus adjustment state of the zooming optical system from the correlation between the two images, the image a and the image b.

Various algorithms have been proposed as techniques for finding the aforementioned correlation between the two images on the pair of line sensors. Representative one is described below.

Specifically, the image a and the image b are formed on the paired two sensors, but all data need not be used as data for detecting a focus adjustment state, and in general, window areas for correlation calculations are set on the two sensors in association with distance measuring (focus detecting) points displayed on a viewfinder.

Next, a value output from one sensor for the image a or the image b is fixed, and while cells read from the window area of the other sensor are sequentially shifted, the associated difference integral is calculated. When the minimum value is obtained, it is determined that there is the highest correlation.

The principal characteristic of this phase difference detection scheme is that it is possible to know from the correlation calculations, even in a defocus state, how many cells there are in defocus on the sensor surfaces, and the amount of the cells is converted into a defocus amount on the optical axis on the focal plane, thereby substantially uniquely determining the driving direction and amount of the focus lens from the focus sensitivity of the lens.

In other words, in a defocus state in which the correlation calculations can be performed to find the phase difference, an in-focus state can be achieved ideally through the next one detection of a focus adjustment state (driving of the focus lens).

It should be noted that the value resulting from the correlation calculations need not be zero strictly, and a residue corresponding to the allowance for focus (in-focus range) is permitted.

In FIG. 5, reference number 71 shows the camera side mount member which is removably coupled to the lens side mount member 55 of the interchangeable lens 50. The lens side mount member 55 and the camera side mount member 71 have electrical contacts, omitted in FIG. 5, through which electrical power is supplied from the camera to the lens and the camera side CPU 62 can communicate with the lens side CPU 53 while the interchangeable lens 50 is mounted on the camera 60 through the mount members 55, 71.

The aforementioned memory 63 in the camera 60 has information about the image pickup device 61 previously stored therein as information on the photosensitive member, that is, information on the diameter of a permissible circle of confusion on the image pickup surface of the image pickup device 61. In addition to the information on the diameter of the permissible circle of confusion, the information on the image pickup device 61 may include information on the image pickup area size of the image pickup device, information on the pixel size and information on the number of pixels, and such information may be previously stored in the memory 63.

The camera side CPU 62 reads the information about the image pickup device 61 in the memory 63 and transmits the read information to the lens side CPU 53 through the aforementioned electrical contacts.

For a camera using a film (silver film) as a photosensitive member, the information on the diameter of the permissible circle of confusion on the film surface may be previously stored in the memory 63 as the information about the photosensitive member and transmitted to the lens side CPU 53.

Next, a focusing operation performed by the camera side CPU 62 and the lens side CPU 53 in the embodiment will be described with reference to a flow chart in FIG. 6.

First, the interchangeable lens 50 is mounted on the camera 60 by coupling the mount member 55 of the interchangeable lens 50 to the mount member 71 of the camera 60. In this manner, the interchangeable lens 50 and the camera 60 are connected to each other through the electrical contacts of the mount members 55, 71 such that electrical power is supplied from the camera 60 to the interchangeable lens 50 and the interchangeable lens 50 can communicate with the camera 60.

The camera side CPU 62 reads from the memory 63 the information about the photosensitive member (the aforementioned information $\delta$ on the diameter of the permissible circle of confusion on the image pickup surface of the image pickup device 61 or the information $\delta$ on the diameter of a permissible circle of confusion on the film surface) and transmits the information about the photosensitive member to the lens side CPU 53 (step 601).

Next, the lens side CPU 53 determines whether the information $\delta$ on the diameter of the permissible circle of confusion indicates a value identical to or larger than preset information on the smallest diameter of a permissible circle of confusion (step 602).

The preset information on the smallest diameter of the permissible circle of confusion refers to information about the photosensitive member (image pickup device 61 or film) with the smallest diameter of the permissible circle of confusion on the photosensitive surface (image pickup surface or film surface) of photosensitive members that can be detected on the basis of the pitch (minimum resolution pitch) of the slits formed in the pulse plate of the aforementioned encoder 52.

When it is determined at step 602 that the information $\delta$ on the diameter of the permissible circle of confusion is the same as the preset information on the smallest diameter of the permissible circle of confusion, the lens side CPU 53 sets an accuracy priority mode (step 603). Then, the lens side CPU 53 calculates and sets a in-focus range (=aperture value (F number)×$\delta$) in the accuracy priority mode from the current aperture value of a stop (not shown) of the interchangeable lens 50 and the information $\delta$ on the diameter of the permissible circle of confusion, and calculates and sets a focusing drive pitch (=aperture value (F number)×$\delta$/4) as the driving pattern of the focus lens L2.

The set focusing drive pitch is the minimum resolution pitch of the pulse plate of the encoder 52.

While the embodiment is described for the in-focus range and the focusing drive pitch calculated and set from the current aperture value and the information $\delta$ on the diameter of the permissible circle of confusion, information on the in-focus range and information on the focusing drive pitch including the aperture value and the information $\delta$ of the diameter of the permissible circle of confusion as elements may be previously stored as map data in the memory 54 of the lens such that the in-focus range and the focusing drive pitch are read from the map data and set.

The lens side CPU 53 sets a pitch of one cell as a shift pitch of cells (pixels) in a pair of the line sensors of the AF sensor 70 for finding the correlation between two images in the line sensors, and transmits correlation shift information indicating that the shift pitch is set to one cell and the information on the in-focus range to the camera side CPU 62 (step 604).

Thereafter, when the image taking switch is half pressed, the camera side CPU 62 calculates the correlation between two images of the image a and the image b formed on the pair of the line sensors constituting the AF sensor 70 from the two luminous fluxes divided at the position of the pupil in the zooming optical system of the interchangeable lens 50 while read cells are shifted with a pitch of one cell in the line sensors based on the aforementioned correlation shift information to find an amount and direction of defocus. The lens side CPU 53 finds a driving amount and direction of the focus lens from the information on the amount and direction of the defocus and transmits the information on the driving amount and direction of the focus lens to the lens side CPU 53 (step 605).

Then, the lens side CPU 53 drives the focus motor 51 with the focusing drive pitch set at step 604 based on the aforementioned information on the driving amount and direction of the focus lens (target position) to move the focus lens L2 (step 606).

The set focusing drive pitch is the minimum resolution pitch of the pulse plate of the encoder 52 as described above.

As the focus lens L2 moves to the position corresponding to the aforementioned information on the driving amount and direction of the focus lens, the camera side CPU 62 calculates the correlation at this point between the two images of the image a and the image b formed on the pair of the line sensors constituting the AF sensor 70 while read cells are shifted with a pitch of one cell in the line sensors based on the aforementioned correlation shift information (step 607). The CPU 62 then finds a defocus amount from the calculation result and determines whether that defocus amount falls within the in-focus range set at step 604 (step 608).

When it is determined at step 608 that the defocus amount does not fall within the in-focus range, the camera side CPU 62 finds a driving amount of the focus lens L2 from the defocus amount at this point and finds the number of remaining pulses (the number of pulses to be driven) with the focusing drive pitch set at step 604 (step 609). The processing returns to step 606 at which the lens side CPU 53 drives the focus motor 51 by the number of remaining pulses with the set focusing drive pitch to move the focus lens L2. Then, the operations at step 607 and step 608 are repeated.

When it is determined at step 608 that the defocus amount falls within the in-focus range, the focus lens is in focus.

Thereafter, in response to an operator fully pressing the image taking switch, a predetermined image taking operation is performed (step 610). For a camera using an image pickup device, the image pickup device photoelectrically converts an optical image into an image signal which is processed by an image processing circuit omitted in FIG. 5, and then saved (stored) in the memory 64 for saving images and displayed on the display 65.

For a camera using a film, an optical image is held (recorded) on the film surface by exposing the film surface. In addition, for a camera using a film configured to have another image pickup device and the display 65 as mentioned above, an optical images is held (recorded) on the film surface by exposing the film surface, while an optical image of light guided toward the prism 68 by the quick return mirror 66 is formed by the other image pickup device (not shown) and the resulting image signal is displayed on the display 65.

On the other hand, when it is determined at step 602 described above that the information δ on the diameter of the permissible circle of confusion as the information about the photosensitive member is larger than the preset information of the smallest diameter of the permissible circle of confusion, the lens side CPU 53 sets a high speed support priority mode (step 611).

Then, the lens side CPU 53 calculates and sets a in-focus range (=aperture value (F number)×δ) in the high speed support priority mode from the current aperture value of the stop (not shown) of the interchangeable lens 50 and the information δ on the diameter of the permissible circle of confusion, and calculates and sets the driving pitch (=aperture value (F number)×δ/4) of the focus lens L2.

The set focusing drive pitch is larger than the minimum resolution pitch of the pulse plate of the encoder 52. Thus, the pulses (pulses at the minimum resolution) produced when the slits in the pulses plate of the encoder 52 are detected by the photointerrupter are caused to correspond to the set focusing drive pitch, for example, such that two pulses correspond to one count or n pulses (n is an integer) correspond to one count to change the detection resolution of the encoder 52 for detection with the set focusing drive pitch.

The lens side CPU 53 sets a pitch of two cells as the shift pitch of cells (pixels) in a pair of the line sensors of the AF sensor 70 for finding the correlation between two images in the line sensors, and transmits the correlation shift information indicating that the shift pitch is set to two cells and the information on the in-focus range to the camera side CPU 62 (step 612).

Thereafter, when the image taking switch is half pressed, the processing proceeds to step 605 as described above at which the CPU 62 calculates the correlation between the two images of the image a and the image b on the AF sensor 70 while read cells are shifted with the pitch of two cells on the line sensors based on the aforementioned correlation shift information to find an amount and direction of defocus, and from the information on the amount and direction of defocus, finds a driving amount and direction of the focus lens. The CPU 62 then transmits the information on the driving amount and direction of the focus lens to the lens side CPU 53 (step 605).

Thus, the lens side CPU 53 drives the focus motor 51 with the focusing drive pitch set at step 612 based on the aforementioned information on the driving amount and direction of the focus lens (target position) to move the focus lens L2 (step 606).

The set focusing drive pitch is twice or n times (n is an integer) the minimum resolution pitch in the pulse plate of the encoder 52 as described above.

As the focus lens L2 moves to the position corresponding to the aforementioned information on the driving amount and direction of the focus lens, the camera side CPU 62 calculates the correlation between the two images of the image a and the image b formed on the pair of the line sensors constituting the AF sensor 70 at that point while read cells are shifted with the pitch of two cells in the line sensors (step 607). The CPU 62 finds an amount of defocus from the calculation result and determines whether that defocus amount falls within the in-focus range set at step 612 (step 608).

When the defocus amount does not fall within the in-focus range at step 608, the camera side CPU 62 finds a driving amount of the focus lens L2 from the defocus amount in this case to find the number of remaining pulses (the number of pulses to be driven) with the focusing drive pitch set at step 612 (step 609). Next, the processing returns to step 606 at which the lens side CPU 53 drives the focus motor 51 by the number of remaining pulses with the set focusing drive pitch to move the focus lens L2. Then, the operations at step 607 and step 608 are repeated.

When the defocus amount falls within the in-focus range at step 608, the focus lens is in focus. Thereafter, when the image taking switch is fully pressed, the aforementioned predetermined image taking operation is similarly performed (step 610).

Figure 6:
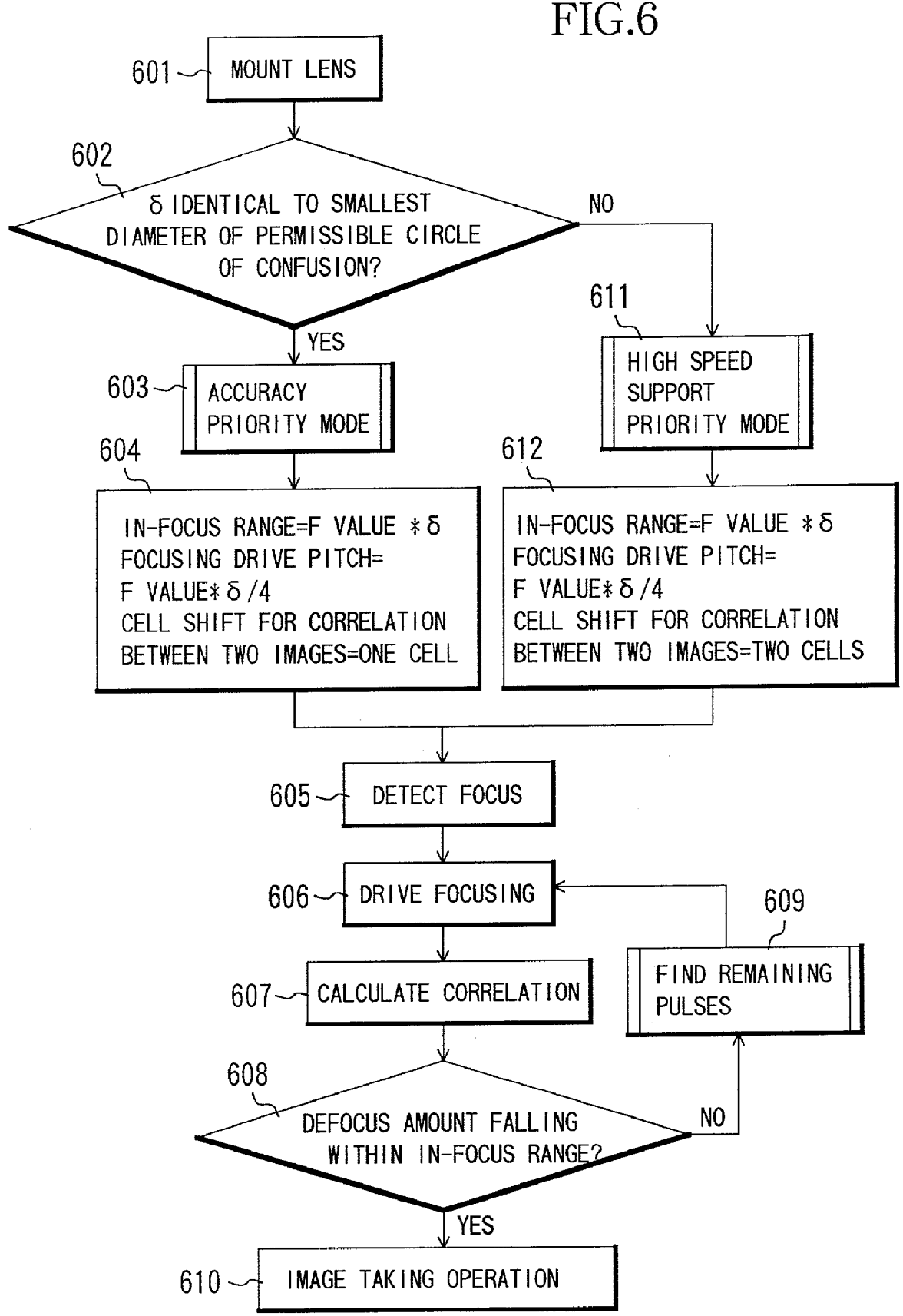
FIG. 6 is a flow chart for explaining a focusing operation in the camera system in FIG. 5.

In the description of the flow chart in FIG. 6, each of the operation of acquiring the aforementioned information about the photosensitive member and the operations of setting the in-focus range, the focusing drive pitch, and the cell shift for the correlation calculations needs to be performed only once when the interchangeable lens 50 is mounted on the camera 60. The acquired information about the photosensitive member and the information on the set in-focus range and the focusing drive pitch may be stored in the memory 54 in the lens and the information on the set cell shift for the correlation calculations may be stored in the memory 63 in the camera such that each stored information is used to perform the operations at step 605 to 609 described above.

As described above, in the embodiment, in accordance with the information on the photosensitive member (information on the diameter of the permissible circle of confusion) of the camera 60 on which the interchangeable lens 50 is mounted, the driving pitch of the focus motor for driving the focus lens L2 of the interchangeable lens 50 is changed to achieve the optimal focus operation for the photosensitive member and to obtain an in-focus state with the focus accuracy suitable for the photosensitive member. Thus, the single interchangeable lens can be used in common to the plurality of types of cameras such as a camera using a film or cameras using different image pickup devices.

The aforementioned embodiment shown in FIG. 2 to FIG. 4 has been described for an example in which the stepping motor is used as the focus motor and the driving pattern of the stepping motor is changed in accordance with the information on the photosensitive member (image pickup device or film) of the camera. However, instead of the stepping motor, the DC motor and the encoder for detecting the motor driving amount and the focus lens driving amount described in the embodiment shown in FIG. 5 and FIG. 6 may be used to change the driving pitch of the focus motor (focus lens) in accordance with the information about the photosensitive member (image pickup device or film) similarly to the embodiment shown in FIG. 5 and FIG. 6.

In addition, in the embodiment shown in FIG. 5 and FIG. 6, instead of the DC motor which is the focus motor and the encoder, the stepping motor described in the embodiment shown in FIG. 2 to FIG. 4 may be used to change the driving pattern (a driving pitch for a film) of the stepping motor in accordance with the information on the photosensitive member (image pickup device or film) of the camera.

As described above, according to the aforementioned respective embodiments, in the camera system including the plurality of types of cameras provided with different photosensitive members and the interchangeable lens applicable in common to these cameras, an in-focus state can be achieved with focus accuracy in accordance with (suitable for) the photosensitive members.

What is claimed is:

1. A camera system comprising:
    a camera comprising an image pickup device to pick up an optical image, a first storage circuit for storing information about the image pickup device, and a first communication unit; and
    a lens apparatus removably mounted on the camera and adapted to form an optical image on the image pickup device, the lens apparatus comprising a focus lens, a second storage circuit for storing a plurality of driving characteristics of the focus lens, and a second communication unit which can communicate with the first communication unit; and
    a controller selecting one of the plurality of driving characteristics stored in the second storage circuit and driving the focus lens using the selected driving characteristics,
    wherein the controller selects the driving characteristics in accordance with the information which is stored in the first storage circuit and sent to the controller from the camera through the first and the second communication unit, and
    wherein the information stored in the first storage circuit is selected from the group consisting of image pickup area size, number of pixels, pixel size, and diameter of a permissible circle of confusion on the image pickup surface of the image pickup device.

2. The camera system according to claim 1,
    wherein the camera comprises a focus detection unit detecting a focus adjustment state of the focus lens, and the lens apparatus comprises a lens driving unit driving the focus lens,
    wherein the controller uses the selected driving characteristics to control the lens driving unit based on information detected by the focus detection unit.

3. The camera system according to claim 2,
    wherein the controller acquires the information stored in the first storage circuit and the information detected by the focus detection unit through the first and the second communication unit.

4. The camera system according to claim 2, wherein the driving characteristic is a waveform of a driving voltage applied to the lens driving unit.

5. The camera system according to claim 2, wherein the driving characteristic is a driving pitch of the focus lens by the lens driving unit.

6. The camera system according to claim 1, wherein the controller changes an amount of wobbling of the focus lens in accordance with the selected driving characteristic.

7. The camera system according to claim 1, wherein the controller changes a condition for determining an in-focus state of the focus lens in accordance with the selected driving characteristic.

8. The camera system according to claim 1, wherein the controller is configured to receive the information only when the lens apparatus is initially mounted on the camera.

9. A lens apparatus for forming an optical image, the lens apparatus being removably mounted on a camera having an image pickup device to pick up the optical image, the camera comprising a focus detection unit for detecting a focus adjustment state of a focus lens of the lens apparatus, a first storage circuit for storing information about the image pickup device, and a first communication unit, the lens apparatus comprising:
    a lens driving unit for driving the focus lens;
    a second communication unit which can communicate with the first communication unit of the camera;
    a second storage circuit for storing a plurality of driving characteristics of the focus lens; and
    a controller for selecting one of the plurality of driving characteristics stored in the second storage circuit and for driving the focus lens using the selected driving characteristics, wherein the controller acquires the information stored in the first storage circuit and the information detected by the focus detection unit through the first and the second communication units, sets the driving characteristic in accordance with the information stored in the first storage circuit, and uses information about the selected driving characteristic to control the lens driving unit based on the information detected by the focus detection unit, and wherein the information stored in the first storage circuit is selected from the group consisting of image pickup area size, number of pixels, pixel size, and diameter of a permissible circle of confusion on the image pickup surface of the image pickup device.

10. The lens apparatus according to claim 9, wherein the driving characteristic is a waveform of a driving voltage applied to the lens driving unit.

11. The lens apparatus according to claim 9, wherein the driving characteristic is a driving pitch of the focus lens by the lens driving unit.

12. The lens apparatus according to claim 9, wherein the controller changes an amount of wobbling of the focus lens in accordance with the selected driving characteristic.

13. The lens apparatus according to claim 9, wherein the controller changes a condition for determining an in-focus state of the focus lens in accordance with the selected driving characteristic.

* * * * *